United States Patent

[11] 3,601,839

| [72] | Inventor | Masumi Kato |
| --- | --- | --- |
| | | Aichi-gun, Japan |
| [21] | Appl. No. | 847,559 |
| [22] | Filed | Aug. 5, 1969 |
| [45] | Patented | Aug. 31, 1971 |
| [73] | Assignee | Nippon Denso Kabushiki Kaisha |
| | | Kariya-shi, Japan |
| [32] | Priority | Aug. 12, 1968 |
| [33] | | Japan |
| [31] | | 43/57208 |

[54] WINDSHIELD WIPER APPARATUS
12 Claims, 12 Drawing Figs.

| [52] | U.S. Cl. | 15/250.19 |
| --- | --- | --- |
| [51] | Int. Cl. | B60s 1/08 |
| [50] | Field of Search | 15/250.16, |
| | 250.17, 250.19, 250.13, 250.23, 250.29, 250.30 | |

[56] References Cited
UNITED STATES PATENTS

| 2,936,477 | 5/1960 | Feller | 15/250.19 |
| --- | --- | --- | --- |
| 3,213,478 | 10/1965 | Pollock | 15/250.19 |
| 3,225,376 | 12/1965 | Heiler | 15/250.19 |
| 3,226,756 | 1/1966 | Heiler | 15/250.19 |
| 3,290,715 | 12/1966 | Heiler | 15/250.19 |

Primary Examiner—Robert W. Jenkins
Attorney—Cushman, Darby & Cushman

ABSTRACT: A windshield wiper apparatus of the type that is provided with a cover for shielding wiper blades when they are not in use, in which means are provided to maintain the cover in its closed position when the wiper blade and arm assemblies are both in their stowed or parking positions and in their wiping operations and to open the cover only when the assemblies are moved into or out of their stowed positions.

PATENTED AUG 31 1971 3,601,839

INVENTOR

Masumi Kato

BY Cushman, Darby & Cushman

ATTORNEYS

WINDSHIELD WIPER APPARATUS

BACKGROUND OF THE INVENTION

Field of the Invention

The present invention relates to a windshield wiper apparatus and, more particularly, to a wiper apparatus having wiper blade shielding means which are operable to cause a wiper blade shielding cover to close when the wiper blades are both in wiping operations and in stowed positions.

In conventional wiper apparatus for use with vehicle, the wiper blades for wiping the windshield are positioned or parked at the lower extremity of the windshield when the blades are not in use. This produces adverse effects not only on the wiper blades per se, such as acceleration of weathering and efforescence of the blade material and adhesion of sand and dust particles onto the blades, but also on the operator's range of sight. In order to eliminate these difficulties, there have been devised various types of wiper apparatus. The wiper apparatus thus devised is provided with recess or space provided in the front body of the vehicles for stowing therein and shielding by means of the cover for the space the whole of the wiper blade and arm assemblies when they are not in use. A part of this type of wiper apparatus has begun to be put into practical use in United States. An example of this type of wiper apparatus is disclosed in U.S. Pat. No. 3,226,756 issued on Jan. 4, 1966 to Paul S. Heiler.

All of the wiper apparatuses of this type are of the design that wiper blade and arm assemblies when not in use are stowed within a recess and shielded from the sight by a cove which is adapted to be kept open when the wiper blade and arm assemblies are in their wiping operations. This design, therefore, has drawbacks that, in operation of the vehicle in rainy and snowy weather, not only rain and snow will enter directly through the opened opening into the interior of the front body, but also the wiper blades in wiping operations will wipe the water and snow off the windshield and force them through the opening into the space prepared for the stowing or parking of the wiper blade and arm assemblies. This makes it necessary to take measures to cope with water within the hood. In snowy weather driving, the mass of snow accumulated in the stowing space for the wiper blade and arm assemblies makes it impossible to stow the assemblies into the space, so that the operation of the vehicle so as to clean the snow-accumulated parking space.

On the basis of the discovery that the major parts of the rain and snow entering into the parking recess for the wiper blade and arm assemblies are due to the wiping operations of the wiper blades, the present invention contemplates to eliminate the above-mentioned shortcomings by providing a windshield wiper apparatus having a wiper arm and blade assembly shielding closure or cover which is maintained in its closed position when the wiper blade and arm assemblies are both in wiping operations and in stowed positions and which nevertheless permits the wiper arms to be oscillated for the wiping operations of the blades.

It is an object of the present invention to provide a windshield wiper apparatus for the type that includes wiper blade and arm assemblies adapted to be stowed within the body of vehicle when the assemblies are not in use, in which cover means are provided for shielding only the wiper blades when they are not in use and means are provided for actuating the cover means so that the latter are opened only when the wiper blades are moved into and out of their stowed positions.

It is another object of the present invention to provide a windshield wiper apparatus of the type specified in the preceding paragraph and in which said actuating means are in the form of an electromagnet which is energized only when the wiper blades are moved into and out of their stowed positions.

It is still another object of the present invention to provide a windshield wiper apparatus of the type specified in the above paragraph for the first object of the invention and in which said actuating means are in the forms of a combination of a rod connected at one end to said cover means and a lever pivotally connected at one end to the other end of said rod, said lever having its other end extending through the partition between the engine room and the compartment and projecting thereinto, said lever being adapted to be actuated by an operator with his hand or foot.

It is a further object of the present invention to provide a windshield wiper apparatus of the type specified in the above paragraph for the first object of the invention and in which said actuating means are in the form of an actuator which is operable by means of a fluid pressure.

It is a further object of the present invention to provide a windshield wiper apparatus of the type specified in the above paragraph for the first object of the invention and in which said cover means is actuated by the drive for the wiping operations of the wiper blade and arm assemblies.

It is a still further object of the present invention to provide a body structure on which a windshield wiper apparatus of the type specified in the above is mounted and which advantageously prevents or at least minimizes the entrance of rain and snow into the interior of the hood even while the wiper apparatus is in operation.

The other objects and features of the present invention will be made apparent from the following description with reference to the accompanying drawings.

DESCRIPTION OF THE DRAWINGS

It is to be noted that the similar numerals are utilized to indicate similar parts and elements throughout the drawings.

DESCRIPTION OF THE PRIOR ART

The apparatus of the present invention may best be understood as employed in conjunction with a prior art wiper motor and, the invention will be described in conjunction with the wiper drive motor disclosed in Japanese Utility Model Publication No. 10,969/67 (corres. to U.S. Pat. No. 3,197,796 issued on Aug. 3, 1965 to Masumi Kato et al. pertaining to an application filed by the applicant of the present application. It is, however, pointed out that the apparatus of the present invention is not intended to be restricted to the use only with the prior art windshield wiper apparatus above mentioned.

Figures 7, 8:
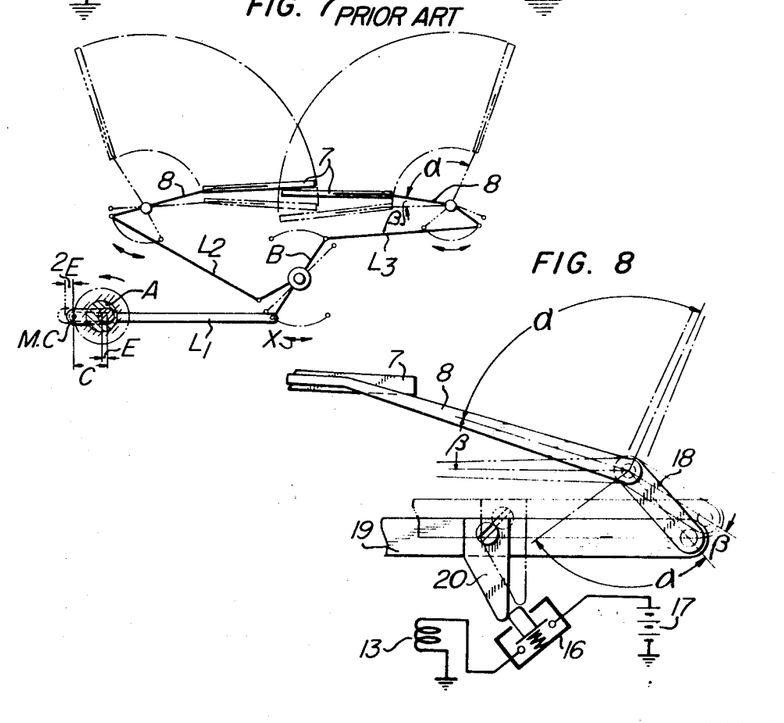
FIG. 7 is a diagrammatic illustration of a link motion extending from the wiper motor to the wiper arm in a prior art wiper apparatus.
FIG. 8 is a diagrammatic illustration of another embodiment of the present invention in which the electrical switch for the actuator for the cover shown in FIG. 6 is disposed at a different position.

FIG. 7 diagrammatically illustrates a link motion employed in the above-mentioned prior art windshield wiper apparatus. The drive mechanism of this type of windshield wiper apparatus has a crank M.C which is to have its radius of rotation which is equal to the length C of the crank M.C minus the dimension of the eccentricity E of an eccentric bushing A as illustrated in FIG. 7 when the crank is not coupled to the bushing by a clutch not shown. In other words, when the crank M.C is in this state, it has an axis of rotation which is coincident with the axis of the eccentric bushing A. Thus, if the crank M.C is rotated in a direction indicated by an arrow, the rotation is transmitted through a link $L_1$ to an intermediate lever B to oscillate the same as shown by an arrow $x$ and this oscillation is transmitted through links $L_2$ and $L_3$ to wiper arms 8 to oscillate the latter within a range of angle $\alpha$. The clutch connecting the crank M.C and the eccentric bushing A is of an arrangement such that when the oscillation of the wiper arms 8 are to be stopped, the crank M.C is released from its clutching engagement with the eccentric bushing A when the wiper arms 8 have come to the positions shown by solid lines in FIG. 7, that is, to the lower extremities of the oscillation range of angle $\alpha$. The crank M.C stops its rotation when the wiper arms are at those positions, but the eccentric bushing A alone continues its rotation. When the continued rotation of the bushing A has completed through 180°, the crank M.C has been moved a distance equal to twice the eccentricity E to a phantom line position and, at the same time, supply of electric power is shut off to completely stop the operation. The movement of the crank M.C through the distance 2E is transmitted through the link $L_1$, the intermediate lever B and the links $L_2$ and $L_3$ to the arms 8 to oscillate the latter through angle $\beta$ into its housed or stowed position. At the start of operation, on the other hand, the eccentric bushing A alone is rotated and, when the rotation is completed through 180° so that the crank M.C has been moved to a position at which it has its radius of rotation decreased by the distance 2E, the clutch is brought into operation to connect the crank M.C to the eccentric bushing A. This movement of the crank M.C causes the wiper arms 8 to have a motion or oscillation through angle $\beta$ to move out of their stowed positions. The clutch is then brought into operation to connect the eccentric bushing A and the crank M.C together so that the latter is caused to rotate with its radius of rotation equal to a distance C–E. Thus, the rotation of the crank causes the wiper arms 8 to have their wiping oscillations within the range of angle $\alpha$.

A description will next be made with reference to FIGS. 1 and 2 which represent, as a typical prior art, a windshield wiper apparatus disclosed in U.S. Pat. No. 3,226,756 issued on Jan. 4, 1966 to Paul S. Heiler. Numeral 1 indicates a motor vehicle windshield and 2 represents a front body portion which has fixed thereto a hinge pin 3 on which a wiper arm covering closure 4 is pivotally mounted. A spring (not shown) is provided for always biassing the closure 4 toward its closed position. A closure lifting lever 5 is rigidly connected to a shaft 6 for oscillating the lever 5. The shaft 6 is to be operatively connected to a motor therefor only when a wiper motor is operating to drive wiper arms for their movements into their stowed positions (these stowing movements correspond to the oscillation through angle $\alpha$ as illustrated in FIG. 7). Numeral 7 indicates a wiping blade, 8 a wiper arm and 9 a shaft for actuating the arm 8 and blade 7.

Figure 1:
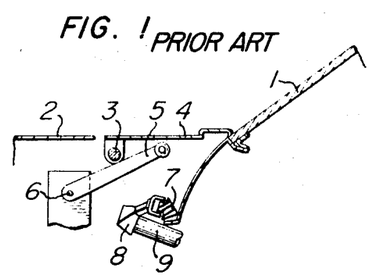
FIG. 1 is a fragmentary sectional view of a typical example of prior art windshield wiper apparatus with a wiper blade and arm assembly thereof shown in its stowed position.
Figure 2:
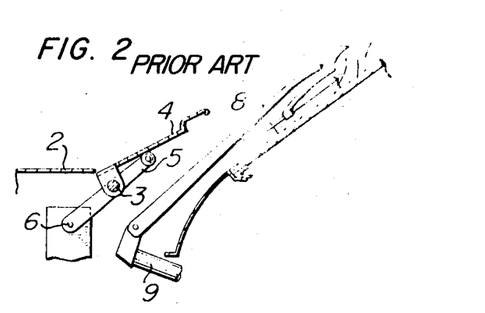
FIG. 2 is a view similar to FIG. 1 but illustrates the wiper apparatus shown in FIG. 1 when the wiper blade and arm assembly is in its wiping operation.

When the wiper apparatus is actuated, the assembly consisting of the wiper blade 7 and arm 8 is moved first through an angle $\beta$ from the stowed position illustrated in FIG. 1. At this moment, the lever 5 is operatively connected to the wiper motor to lift the cover 4, so that the blade 7 and the arms 8 freely move out of their stowed positions through an opening or space defined between the opened cover 4 and the windshield 1. The wiper blade and arm assembly does not have stowing motion when continuing wiping operation and, thus, the cover 4 is maintained in its lifted or opened position shown in FIG. 2. When the wiping operation s completed, the wiper blade and arm assembly is moved downwardly beyond the lower extremity of the wiping range by an angle $\beta$, that is, stowing movement. At this moment, the lever 5 has a synchronized downward movement to its initial position shown in FIG. 1. As will be appreciated from the foregoing description, the prior art wiper apparatus has accompanied a problem that, in operation, the wiping movement of the wiper blade 7 forces the snow accumulated on the windshield into the wiper blade and arm assembly stowing space as if a bulldozer removes snow, with the result that the stowing space is filled up with the snow to make it impossible to stow the wiper blade and arm assembly into the stowing space.

DESCRIPTION OF PREFERRED EMBODIMENTS

An embodiment of the present invention will be described with reference to FIGS. 3 to 6. Numeral 1 indicates a motor vehicle windshield and 2 represents a body portion which has fixed thereto a hinge pin 3 on which is pivotally mounted a cover 4 for shielding the space in which wiper blade and arm assemblies are to be stowed. The cover 4 has fixed thereto a fork member 10 carrying between the opposite legs thereof a pin 11 with which is pivotally connected a plunger 12 at its one end. The other end of the plunger is received in an electromagnet 13. A compression coil spring 14 extends around the plunger 12 between the electromagnet and the fork member legs to which the plunger 12 is pivotally connected, so that the spring 14 operates to maintain the cover 4 in its closed position as far as the electromagnet 13 is not energized. The magnet 13 is pivotally connected at the other end to the body of the vehicle by means of a pin 13' so that when the electromagnet is energized, it may electromagnetically operate to move the plunger 12 with respect to the magnet 13 for thereby closing the cover 4. The wiper apparatus includes a pair of wiper blade and arm assemblies comprising blades 7 and arms 8 which are driven by drive shafts 9, only each one of them being shown in FIGS. 3 and 4.

At the end of one of the wiper arms 8 which is connected to the drive shaft 9, provided is a projection 15 which is designed to depress an actuator of a microswitch 16 for closing the switch during that part of the stowing and going-out or rising-up movements of the wiper blade and arm assembly through angle $\beta$ except for its movements at the opposite ends of the range of the angle $\beta$, namely, during the movement of the assembly through an intermediate appropriately 80 percent of the angle $\beta$. When the switch 16 is closed, a closed electrical circuit is formed by a battery 17, the switch 16, the electromagnet 13 and the body of the vehicle to energize the magnet 13 so that the latter causes the plunger 12 to be actuated to open the cover 4. The latter has such dimension and position as to substantially equal to the length and position which are occupied by the blades 7 of the right and left wiper blade and arm assemblies when they are moved into their lowermost positions, so that no interference is produced between the cover 4 and the opposite wiper arms 8 during their wiping operations. Stated in other words, the cover 4 is designed to act as a shield for the right and left blades 7 only. So as to allow the wiper arms 8 to have their wiping oscillation with the cover 4 being maintained closed, a pair of upwardly opened grooves or slots 2' are formed in the body of the vehicle adjacent the opposite ends of the cover 4 as will be seen in FIGS. 5 and 6.

Figure 3:
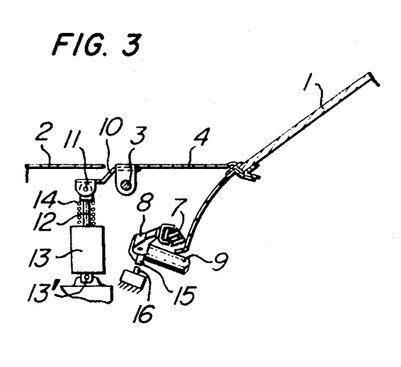
FIG. 3 is a fragmentary sectional view of an embodiment of the wiper apparatus according to the present invention with a wiper blade and arm assembly thereof being shown in its stowed position.
Figure 4:
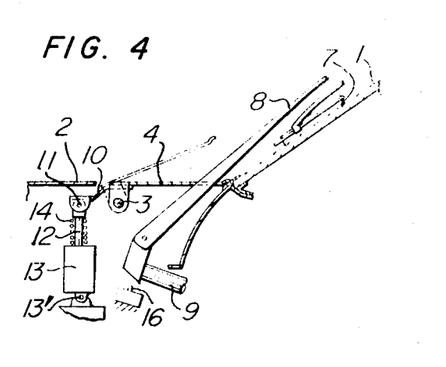
FIG. 4 is a view similar to FIG. 3 but illustrates the wiper apparatus shown in FIG. 3 when the wiper blade and arm assembly thereof is in its wiping operation.
Figure 5:
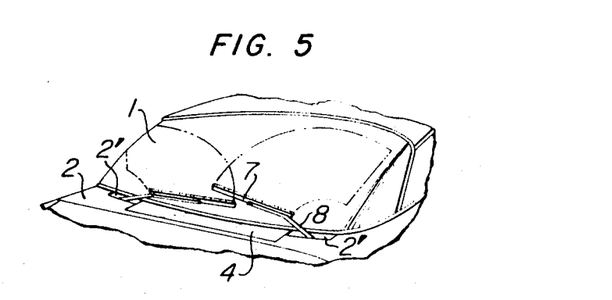
FIG. 5 is a schematic perspective view illustrating the wiper blade and arm assemblies when in their wiping operations.

In operation, if a wiper motor is switched off with the wiper blade and arm assemblies consisting of wiper blades 7 and arms 8 being located in their stowed positions as shown in FIG. 3, the crank of the wiper motor has its radius of rotation decreased by a distance corresponding to the distance 2E in the case of FIG. 7 and each wiper arm 8 commences oscillatory movement through angle $\beta$. Thus, the projection 15 on the arm 8 is moved from its solid line position to phantom line position shown in FIG. 6 to depress the actuator of the microswitch 16 to close the latter, so that a closed electrical circuit is formed between the battery 17 and the electromagnet 13 to allow the latter to attract the plunger 12 against the spring 14. The plunger 12 then pulls down the fork member 10 through the pin 11, so that the cover 4, which is in fixed relation to the fork member 10, is given an opening pivotal movement about the hinge pin 3 to a position indicated by phantom line in FIG. 4. It will, therefore, be noted that the cover 4 is momentarily opened in the initial part of the oscillatory movement of the wiper arm 8 through angle $\beta$. Thus, in the remaining part of the oscillatory movement of the arm 8, the wiper blade 7 is permitted to move out of its stowed position without being interfered by the cover 4. When the blade 7 has been completed moved out of its stowed position, that is, when the arm 8 has reached the solid line position in FIG. 6, the projection 15 is moved away off the actuator of the microswitch 16 to open the electrical contacts therein. The electromagnet 13 is, consequently, deenergized to release the plunger 12 from the electromagnetic attraction provided by the electromagnet 13, so that the spring 14 is allowed to expand axially to upwardly urge the pin 11 and the fork 10 thereby to move the cover 4 to its closed position shown by solid line in FIG. 4. Thereafter, the motor crank is rendered to rotate with decreased radius corresponding to the decreased radius (C–E) in the case of FIG. 7 so that the wiper arm 8 continues its oscillatory motion within the range of angle $\alpha$. The oscillatory motion in this range does not produce any interference since the opened slots 2' are formed in the body 2 as shown in FIGS. 5 and 6.

As will be apparent from the above description, even if the blades 7 gather the snow accumulated on the windshield and force the thus gathered snow toward the inlet opening of the wiper blade and arm stowing space, the cover 4 substantially completely shields the inlet of the space to prevent entrance of the snow thereinto. Thus, the cover 4 achieves an object of the present invention that a wiper blade and arm assembly stowing space be kept free from any accumulation of and filling up with snow which otherwise will be objectionable to the stowing of the assembly into the space. The snow which is allowed to pass through the slots 2' prepared for allowing the wiper arms to oscillate therein is the naturally falling snow only but not the snow gathered together by the blades 7, so that the snow thus passed through the slots 2' does not amount to any objectionable quantity.

Figure 6:
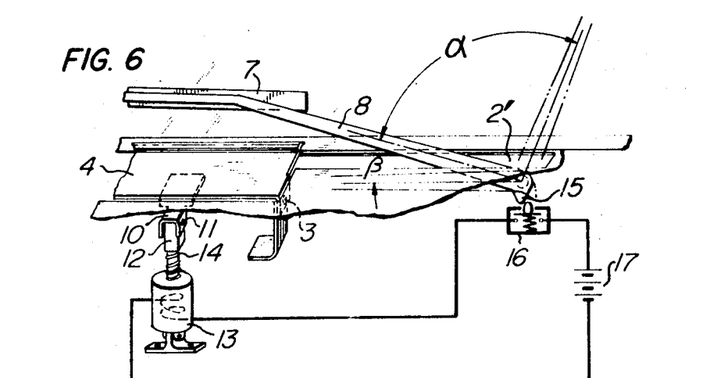
FIG. 6 is an enlarged diagrammatic illustration of an embodiment of an actuator for the cover for the wiper blade and arm assemblies and the electrical circuit for the actuator.

When the wiper apparatus is stopped, the clutch disconnects the crank of the wiper motor from an eccentric bushing to stop the rotation of the crank, as is in the case illustrated in FIG. 7, when the wiper arm 8 has come to the lower extremity of the wiping range of angle $\alpha$ as shown in FIG. 6, or the position shown by solid line in this figure. Thereafter, the crank commences to be moved or travelled substantially linearly a distance twice the eccentricity of the eccentric bushing, as is the case of FIG. 7 in which the crank M.C is moved a distance 2E. Thus, the wiper arm 8 begins its stowing movement through angle $\beta$ and, in the initial part of the stowing movement, the projection 15 in FIG. 6 depresses the actuator of the microswitch 16 to energize the electromagnet 13 which in turn operates to open the cover 4, with the result that the blade 7 and the arm 8 continue their stowing movements without contacting the cover 4. In the final part of the stowing movements, the arm 8 is in the phantom line position shown in FIG. 6 and the projection 15 has been moved past the actuator of the switch 16 to open the latter so that the electromagnet 13 is deenergized, with the result that the compression spring 14 is permitted to expand to completely close the cover 4 and, thus, the stowing movements of the wiper blade and arm assemblies have completed.

The present invention has been described in conjunction with an embodiment thereof illustrated in FIGS. 3 to 6. The principle of the present invention may be put into practice in various forms which will be described hereinunder.

FIG. 8 illustrates a modification in which the microswitch 16 which is in operative association with the movement of the wiper arm through angle $\beta$ in the preceding embodiment is disposed in a position other than that on the wiper arm 8. In the instant embodiment, the wiper arm 8 is oscillated by a bell-crank 18 which in turn is driven by a link rod 19. This rod has secured thereto a plate 20 which is designed to depress an actuator of a microswitch 16 for forming a closed electrical circuit during the oscillatory movement within the angular range $\beta$ excepting the initial and final parts of the movement. During the period of time above specified, therefore, the solenoid of the electromagnet 13 may be energized as in the case illustrate in FIG. 6. It will be readily apparent from the link motion illustrated in FIG. 7 that the microswitch may be mounted on any other convenient member, such as the intermediate lever B, the link $L_1$ or the crank M.C.

Figure 9:
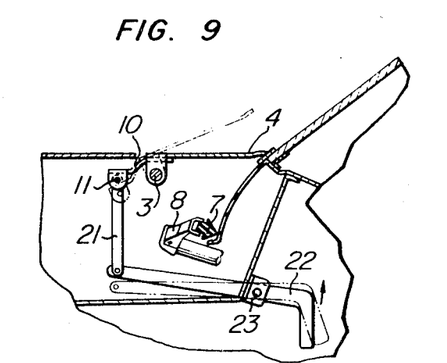
FIG. 9 is a fragmentary sectional view showing still another embodiment of the present invention in which the wiper arm shielding cover is manually operated.

FIG. 9 illustrates a further modification in which a wiper blade and arm assembly shielding cover 4 may be actuated manually or by a foot. In this embodiment, a rod 21, which corresponds to the plunger 12 in the embodiment in FIG. 3, has its free end pivotally connected by a pin to the forward end of a lever 22 which in turn is pivotally mounted by a pivot pin 23 onto the body of the vehicle. When it is desired to move the wiper blade and arm assemblies out of their stowed positions, the lever 22 may be manually returned to its initial position to close the cover 4. When it is required to stow the wiper blade and arm assemblies of the wiper apparatus, the cover 4 may be opened by means of the lever 22 and, when the stowing operation has completed, the cover may again be closed by manual actuation of the lever 22. As such, the apparatus of the present invention may also be actuated by a power obtainable from a hand or a foot of the operator.

Figure 10:
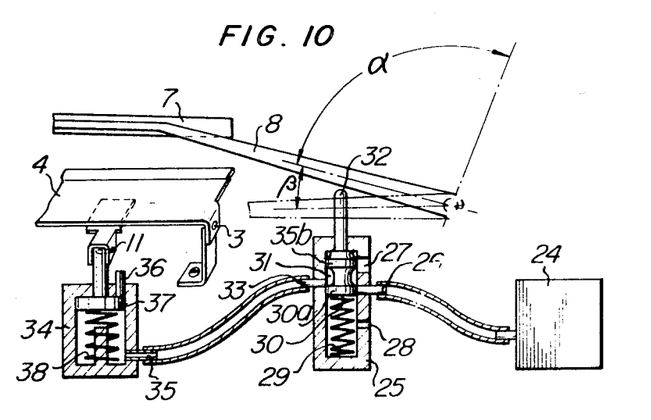
FIG. 10 is a diagrammatic illustration of a further embodiment of the present invention in which the cover for the wiper blade and arm assemblies is operated by means of a fluid pressure.

FIG. 10 illustrates a further embodiment of the invention in which the cover 4 is actuated by a fluid pressure. The structure of this embodiment includes a vacuum tank 24 and a switchover valve housing 25 having an input port 26 which is connected by a tubing to the vacuum tank 24. The valve housing 25 is formed therein with a pair of air intake and discharge orifices 27 and 28 which communicate the interior of the valve housing with the atmosphere. Disposed within the valve housing 25 is a compression spring 29 by which a piston 30, which is rested on the spring, is always biassed upwardly to the position shown in FIG. 10. The orifices 27 and 28 are provided for facilitating the movement of the piston 30. This piston has its opposite large diameter ends 30a and 30b which cooperate to define therebetween an annular relief groove 31. An actuating rod 32 is slidably received in and extends outwardly through a bore in the top of the valve housing 25 with the bottom end of the rod 23 connected to the top of the piston 30. The actuating rod 32 is arranged to be depressed by an arm 8 of the wiper apparatus when the wiper blade and arm assemblies are moved into their stowed positions. More specifically, the arrangement is such that at the initial stage of the stowing movement of the arm 8 through angle **, the arm 8 depresses the actuating rod 32 to a position in which the input port 26 and an output port 33 in the valve housing 25 are brought into communication with one another by the annular groove 31 in the piston 30 and, at the final stage of the stowing movement, the input port 26 is closed by a large diameter end 30b of the piston. An actuator 34 for the cover 4 has its input port 35 which is connected by a tubing to the output port 33 of the switchover valve housing 25. The actuator 34 is formed therein with an air discharge port 36 for facilitating the operation of a piston 37 having a stem which slidably extends through a bore in the top of the actuator and is pivotably connected to the bracket on the cover 4 in similar manner to those in the aforedescribed embodiments. A compression spring 38 is disposed within the actuator 34 under the piston 37 to always bias the same upwardly for thereby normally closing the cover 4.

The apparatus of the instant embodiment operates in the following manner: At the initial stage of the stowing movement, the arm 8 depresses the actuating rod 32 to move downwardly the piston 30 which in turn operates to close the air intake and discharge orifice 27 by the large diameter end portion 30b and, at the same time, permit the output port 33 to communicate with the input port 26 through the annular groove 31 in the piston. Thus, the negative pressure in the vacuum tank 24 is exerted through the input port 35 of the actuator 34 to the undersurface of the piston 37 so that the latter is moved downwardly against the spring 38 to open the cover 4. At the final stage of the stowing movement through angle β, by which stage the stowing of the wiper arm and blade assemblies has been substantially completed, the piston 30 is moved to a position in which the large diameter end 30b thereof closes the input port 26 of the valve housing 25. At this stage, the output port 33 of the valve 25 is in communication with the air intake and discharge orifice 27 so that the atmospheric pressure is introduced through the orifice 27, the upper space within the valve housing 25, the output port 33 and the input port 35 of the actuator 35 into the interior thereof to allow the spring 38 to expand for upwardly move the piston 37 to the position shown in FIG. 10. Thus, the cover 4 is closed. When the wiper motor is energized, the arm 8 commences to move out of the position shown by phantom line, so that the compression spring 29 upwardly biases the piston 30 in such a manner that the large diameter portion 30b is upwardly moved away off the input port 26 of the valve housing 25 and then past the output port 33 thereof, with the result that the input port 26 is brought into communication with the output port 33 to allow the vacuum source to be exerted through the input port 35 of the actuator 34 to the piston 37. Thus, the piston 37 is moved downwardly against the spring 38 to open the cover 4 so that the rising-up movements of the wiper blade and arm assemblies are not interfered by the cover 4. When the blade 7 and the arm 8 have reached the final position of the rising-up movement through angle β, that is, the solid line position in FIG. 10, the piston 30 is moved to a position in which the output 33 and the air intake and discharge orifice 27 are brought into communication with one another, so that the negative pressure within the actuator 34 sucks the atmospheric pressure through the air intake and discharge orifice 27 of the valve 25 into the interior of the actuator 34 to permit the spring 38 to expand upwardly thereby to move the cover 4 to its closed position shown in FIG. 10. During the following wiping operation, the cover 4 is maintained in its closed position.

As will be apparent from the above description, the negative pressure in the vacuum tank 24 of the instant embodiment is used only at the moment that the cover 4 is actuated, but is not consumed during both stowing and wiping operations of the wiper blade and arm assemblies. Thus, it will be well appreciated that the present embodiment is practically useful. Similar function may be obtainable from a modification in which a pressurized tank is substituted for the vacuum tank 24. In this case, the tubing connecting the output port 33 of the valve housing 25 to the input port 35 of the actuator 34 is removed and, instead, the output port 33 and the intake and discharge port 36 of the actuator are interconnected by another tubing. The apparatus of the instant embodiment may also be actuated by means of hydraulic pressure provided that there is provided a return circuit for the liquid medium employed. As will be noted from the above, the apparatus of the instant embodiment may also be actuated by means of a fluid pressure.

Figure 11:
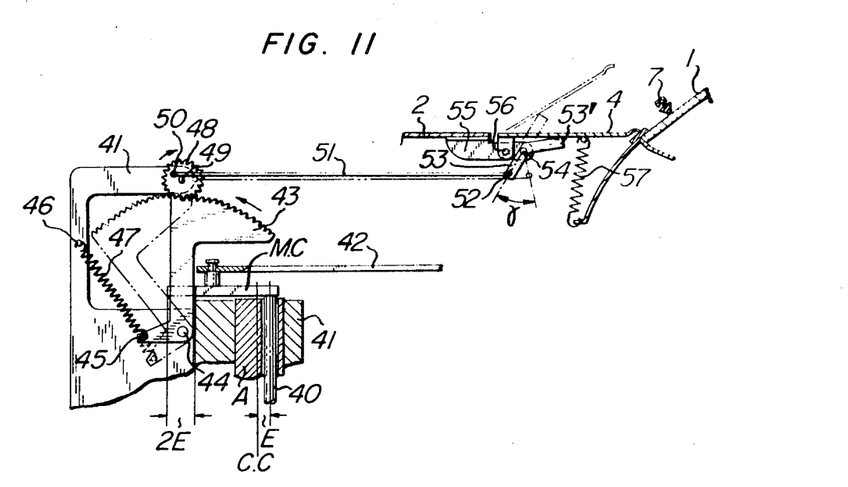
FIG. 11 is a diagrammatical illustration of a still further embodiment of the present invention in which the wiper motor is utilized also to operate the cover for the blade and arm assemblies.

FIG. 11 illustrates a further embodiment of the present invention in which the cover 4 is actuated by the motor for driving the wiper blade and arm assemblies for their wiping operations. The driving mechanism is of the type that is illustrated in the diagrammatical plan view of FIG. 7 and comprises an eccentric bushing A having formed therein an eccentric bore in which is received a shaft portion 40 of a motor crank M.C. When the wiper apparatus is in wiping operation, the eccentric bushing A and the shaft portion 40 are coupled together by a clutch (not shown) so that the shaft portion 40 is swiveled about the center C.C of the eccentric bushing A with the peripheral outer surface of the latter being in sliding movement relative to a surrounding bearing member. The drive mechanism is so arranged that when the wiping operation is to be stopped for the subsequent stowing of the wiper blade and arm assemblies, the eccentric bushing A is disconnected by the clutch from the crankshaft portion 40 when the mechanism is moved to a solid line position shown in FIGS. 7 and 11 to discontinue the rotation of the crank M.C. Thus, the eccentric bushing A alone continues its rotation so that the crank M.C is stretched leftwardly, as viewed in FIG. 11, by a distance 2E, that is, two times the eccentricity E of the eccentric bushing A, to a position shown by phantom lines. A segment gear 43 is pivotally mounted by a pivot pin 44 in such a position as to be oscillated by the stretching movement of the crank M.C. In order to maintain the segment gear 43 normally at the solid line position, a tension spring 47 is provided between a pin 45 on the portion of the gear 43 opposite to the toothed portion thereof and a projection 46 on a housing for the wiper motor. With these arrangements, the crank M.C does not contact the gear 43 during wiping operation but is brought into camming contact with the gear to move the latter in a direction indicated by the arrow at the stage that the crank M.C is shifted a distance 2E for the stowing of the wiper blade and arm assemblies. A pinion 48 is disposed in meshing engagement with the teeth on the gear 43 and is rotatably mounted on a pin 49 fixed to the housing 41. The pinion 48 is formed thereon with teeth of such number that one complete rotation of the pinion is produced by the oscillation of the gear 43 caused by the travel of the crank M.C through the distance 2E. The pinion 48 is mounted thereon with a crankpin 50 to which a link 51 is pivotably connected at one end. The other end of the link 51 is pivotally connected by a pin 52 to one end of a lever 53 which has its other end 53' in contact with the undersurface of the cover 4. The lever 53 is pivotally mounted by a pin 54 on a support plate 55 fixed to the body 2. The plate 55 also supports a hinge pin 56 for the cover 4.

With the arrangement described, when the crank M.C is travelled one-half the distance 2E, the pinion 48 is rotated one-half its one complete rotation to shift the link 51 to a position shown by phantom line, with the result that the lever 53 is oscillated through angle γ. When the crank M.C is moved through the remaining one-half the distance 2E, the pinion 48 is also rotated through the remaining one-half its one complete rotation to move the link 51 to its initial solid line position with a subsequent return oscillation of the lever 53 through angle γ. A tension spring 57 is provided between the inner surface of the cover 4 and the vehicle body so as to always bias the cover toward its closed position.

In operation, when the wiper motor is stopped to discontinue the wiping operation of the apparatus, the eccentric bushing A is disconnected by the clutch from the shaft portion 40 of the crank M.C so that the latter commences its travel through distance 2E from the solid line position in FIG. 11. Consequently, the gear 43 begins to be oscillated in the direction indicated by the arrow to revolve the crankpin 50 on the pinion 48 in the direction indicated by the adjacent arrow. When the crank M.C has travelled one-half the distance 2E, the pin 50 has been revolved for 180° with the result that the lever 53 is oscillated through angle γ by the link 51 to cause the forward end 53' of the lever 53 to open the cover 4 to the maximum extent. At this stage of operation the wiper arm 8 and the blade 7 are at the intermediate positions of their stowing movements. Thus, it will be appreciated that the opened cover 4 enables the wiper blade and arm assemblies to have sufficient clearance from the cover for being moved therethrough into their stowed positions. With the next travel of the crank M.C through the remaining one-half the distance 2E, the gear 43 is further oscillated to a position shown by a phantom line. Consequently, the pinion 48 is given the remaining one-half its one complete rotation to move the link 51 to its initial solid line position with the resultant returning oscillation of the lever 53 through angle γ. Thus, the cover 4 is allowed to be pulled down to its completely closed position by the spring 57. At this stage, the arms 8 and the blades 7 are moved to the position shown by phantom lines in FIG. 7 to finish their stowing movements.

At the start of the operation, the mechanism operates in the reversed manner. Specifically, the rotation of the eccentric bushing A shifts the crank M.C from the phantom line position to the solid line position through distance 2E with consequent oscillation of the gear 43 caused by the spring 47 in the direction opposite to the direction indicated by the arrow, with the result that the link 51 causes the lever 53 to have a reciprocation of oscillatory movements each through angle γ. Simultaneously, the arms 8 and the blades 7 commence their rising-up movements. These operations are identical with those described in conjunction with FIG. 7 and, with the commencement of the rising-up movements of the wiper blade and arm assemblies through angle β, the cover 4 is opened to permit the arms 8 and the blades 7 to pass freely through the space thus formed between the opened cover and the windshield. During the following wiping operation within the range of angle α, since the crank M.C is coupled to the eccentric bushing A to swivel about the center of the bushing without contacting the segment gear 43, the cover 4 is maintained in its closed position.

At such, the apparatus of the present invention may utilize a single motor to drive both wiper blade and arm assemblies and the cover 4. It is also to be noted that a separate motor may be provided only for the actuation of the cover 4. In this instance, the separate motor may be controlled by means of a switch which is actuated by, for example, the crank M.C of the wiper drive mechanism when the crank is caused to travel the distance 2E.

Figure 12:
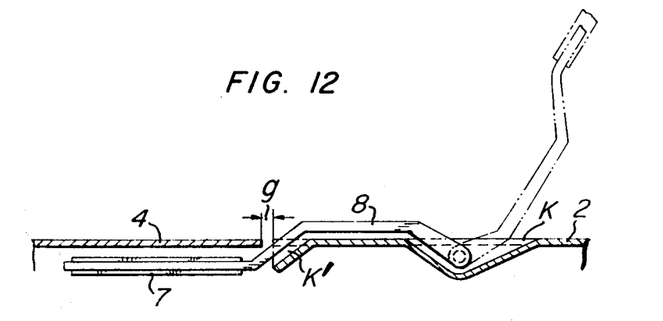
FIG. 12 is a fragmentary sectional front view showing a modified design of the body structure of the vehicle which is equipped with an wiper apparatus according to the present invention.

A further description will next be made with respect to a body structure which is suited for preventing snow and rain from entering into the interior of the engine room. FIG. 12 illustrates an embodiment of a body structure which has reduced area of opening for the oscillatory movements of each wiper arm 8. The body structure has only a single gap g for each wiper blade and arm assembly. This is achieved by using an arm of arcuate shape and by forming recesses in the body at the portion K adjacent the wiper arm driving shaft and at the portion K' adjacent each end of the cover 4.

The present invention has disclosed a windshield wiper apparatus of the type that comprises wiper blade and arm assemblies consisting of blades and arms adapted to be stowed into the body at a portion adjacent the windshield, in which a cover for shielding the blade portions only is provided, said cover being maintained in its closed position when the wiper blade and arm assemblies are both in their stowed positions and in their wiping operations. This design assures positive elimination of the drawback that in the operation of a vehicle in snowy weather, the snow accumulated on the windshield is otherwise forced by the wiper blades into the wiper blade stowing space within the body. Thus, the present invention provide an advantage that the stowing and parking of the wiper blade and arm assemblies are assured for all kinds of weather. In addition, the blade portions are completely shielded when the wiper apparatus is not in use, with the results that the operator is afforded an increased or widened range of view and that the blade material is prevented from becoming useless in relatively short period of operation mainly due to otherwise being subjected to weathering. Thus, the present invention provides a novel and advantageous windshield wiper apparatus which is practically remarkably useful.

What is claimed is:

1. A windshield wiper apparatus comprising at least one wiper blade and arm assembly adapted to be stowed within the body of an associated vehicle when said assembly is not in use, cover means for closing an open slot formed in said body when said assembly is both in its stowed and wiping positions, said wiper blade being adapted to be moved into and out of its stowed position through said slot, and means for actuating said cover means so that said slot is opened only when said wiper blade is moved into and out of its stowed position.

2. A windshield wiper apparatus as claimed in claim 1 in which said actuating means comprises a mechanical drive connection operatively connecting said cover means with the drive mechanism for the wiper blade, said drive mechanism being driven by a motor.

3. A windshield wiper apparatus as claimed in claim 2 in which said drive mechanism includes an eccentric bushing connected to a wiper motor and provided with an eccentric bore therein, a crank arm linked to said wiper arms and a shaft rigidly connected to one end of said crank arm, said shaft being adapted to be coupled by a clutch to said eccentric bushing during wiping operation of said apparatus for causing said crank arm to be rotated about the central axis of said eccentric bushing, said shaft being adapted to be disconnected from said eccentric bushing, a segment gear disposed in such a position as to be oscillated by the stretching movement of said crank arm, a rotatable pinion having teeth in meshing engagement with those on said segment gear, a crankpin on said pinion and a link rod interconnecting said crankpin and a lever held in contact with the undersurface of said cover means, and a tension spring always urging said cover means in a direction to close the latter.

4. A windshield wiper apparatus as claimed in claim 2 in which said mechanical drive connection comprises a gear train and a link mechanism.

5. A windshield wiper apparatus as claimed in claim 1 in which said wiper arm has a root end portion always exposed to the atmosphere, a forward end portion on which said wiper blade is mounted and an intermediate bent portion extending between said end portions, said cover means being sized and positioned with respect to said slot such that, when said cover means is in its closing position a small opening is defined between at least one end of said cover means and the adjacent end of said slot for allowing said intermediate bent portion of said wiper arm to extend through said small opening into the interior of the engine compartment when said assembly is in its stowed position whereby said slot has a minimized area of opening to said interior when said assembly is in its stowed position.

6. A windshield wiper apparatus as claimed in claim 1 in which said actuating means comprise an electromagnet which is adapted to be energized only when the wiper blades are moved into and out of their stowed positions.

7. A windshield wiper apparatus as claimed in claim 6 in which the energization of said electromagnet is controlled by an electric switch disposed in such a position that the actuator of said switch is depressed by one of said wiper arms and the members of the link motion extending from a wiper motor to said arms, said actuating means including a plunger connected to said cover means, whereby said electromagnet is energized in synchronism with the movements of said wiper blades into and out of their stowed positions thereby to actuate said cover means through said plunger.

8. A windshield wiper apparatus as claimed in claim 1 in which said actuating means comprise a rod member connected at one end to said cover means and a lever member pivotally connected at one end to the other end of said rod member, said lever member having its other end extending through the partition between the engine room and the compartment and projecting into the latter, said lever member being adapted to be actuated by an operator with his hand or foot.

9. A windshield wiper apparatus as claimed in claim 1 in which said actuating means comprise an actuator operable by means of a fluid pressure.

10. A windshield wiper apparatus as claimed in claim 9 in which said fluid pressure-operated actuator comprises a piston having a stem connected to said cover means, an actuator housing hermetically enclosing said piston, a spring within said housing always urging said piston in a direction to close said cover means, a pressure inlet port formed in said housing on one side of said piston and an air intake and discharge orifice formed in said housing on the other side of said piston, said piston being adapted to be actuated by said fluid pressure in synchronism with the movements of said wiper blades into and out of their stowed positions thereby to open said cover means against the biassing action of said spring.

11. A windshield wiper apparatus as claimed in claim 10 in which pressure pressure switching-over valve means are provided for controlling the operation of said fluid pressure-operated actuator, said valve means including a valve housing, a piston hermetically enclosed within said housing, a piston stem sealingly and slidably extending outwardly of said valve housing toward one of said wiper arms, a spring within said valve housing always urging said piston in a direction toward said one wiper arm, a pressure inlet port in said value housing connected to a pressure source and a pressure outlet port in said value housing connected to said pressure inlet port in said actuator, said piston stem being adapted to be depressed by said one wiper arm when the latter is moved into its stowed position whereby the piston of the valve means is moved to a position in which said pressure inlet and outlet ports of said valve means are brought into communication with one another to allow the pressure from said pressure source to flow past said valve means into the interior of said fluid pressure-operated actuator.

12. A windshield wiper apparatus as claimed in claim 1 in which each wiper arm has a root end portion always exposed to the atmosphere, a forward end portion to which a wiper blade is attached and an intermediate bent portion extending between the end portions, said intermediate bent portion extending through an inclined recess formed in the body of vehicle adjacent each end of said cover means when the wiper blades are in their stowed position and are shielded by said cover means whereby the area of the opening to the interior of the engine room is minimized.